(12) United States Patent
Williams et al.

(10) Patent No.: US 11,188,760 B2
(45) Date of Patent: Nov. 30, 2021

(54) METHOD AND SYSTEM FOR GAMING SEGMENT GENERATION IN A MOBILE COMPUTING PLATFORM

(71) Applicant: Medal B.V., Naarden (NL)

(72) Inventors: Ted R Williams, Mendocino, CA (US); Wilhelmus W. A. de Witte, Long Beach, CA (US); Brandon Paul Cohen, Long Beach, CA (US)

(73) Assignee: Medal B.V., Naarden (NL)

( * ) Notice: Subject to any disclaimer, the term of this patent is extended or adjusted under 35 U.S.C. 154(b) by 0 days.

(21) Appl. No.: 17/117,208

(22) Filed: Dec. 10, 2020

(65) Prior Publication Data

US 2021/0192223 A1 Jun. 24, 2021

Related U.S. Application Data

(60) Provisional application No. 62/946,360, filed on Dec. 10, 2019.

(51) Int. Cl.
*A63F 9/24* (2006.01)
*G06K 9/00* (2006.01)
*A63F 13/86* (2014.01)
*G11B 27/34* (2006.01)
*G11B 27/034* (2006.01)
*A63F 13/79* (2014.01)

(52) U.S. Cl.
CPC .......... *G06K 9/00751* (2013.01); *A63F 13/79* (2014.09); *A63F 13/86* (2014.09); *G11B 27/034* (2013.01); *G11B 27/34* (2013.01)

(58) Field of Classification Search
CPC .......... A63F 13/33; A63F 13/55; A63F 13/85; A63F 13/12; A63F 13/822; A63F 2300/535; A63F 2300/552; A63F 2300/6009; A63F 2300/807
USPC ............................................. 386/241; 463/43
See application file for complete search history.

(56) References Cited

U.S. PATENT DOCUMENTS

| | | | |
|---|---|---|---|
| 8,984,628 B2* | 3/2015 | Mahaffey | H04W 12/10 726/22 |
| 9,396,354 B1* | 7/2016 | Murphy | H04L 51/10 |
| 10,460,765 B2 | 10/2019 | Bloch et al. | |
| 10,511,705 B2* | 12/2019 | Li | H04L 47/22 |
| 10,554,926 B1 | 2/2020 | Post, Jr. et al. | |

(Continued)

*Primary Examiner* — Michael A Cuff
(74) *Attorney, Agent, or Firm* — Timothy J. Bechen; Bechen PLLC

(57) ABSTRACT

A computerized method and system for videogame clip detection and capturing on a mobile computing device includes receiving a user consent for capturing screen content by a content capture executable. The method and system includes executing the content capture executable in a background and monitoring processing operations in a foreground of the mobile computing device. Upon detecting gameplay from a gaming executable executing in the foreground, buffering screen content of the gameplay of the gaming executable in a first memory device for a first period of time. After gameplay, the method and system includes executing the content capture executable in the foreground, including receiving a clip generation command from the user and generating a videogame clip from at least a portion of the screen content in the first memory device. Therein, in response to a clip distribution command, the clip is distributed across a networked connection.

20 Claims, 7 Drawing Sheets

(56) References Cited

U.S. PATENT DOCUMENTS

| | | | |
|---|---|---|---|
| 10,691,740 B1* | 6/2020 | Anorga | G06F 16/54 |
| 2006/0166648 A1* | 7/2006 | Roach, Jr. | H04M 3/4931 |
| | | | 455/411 |
| 2007/0162971 A1* | 7/2007 | Blom | H04L 67/303 |
| | | | 726/17 |
| 2009/0131177 A1 | 5/2009 | Pearce | |
| 2015/0172266 A1* | 6/2015 | Krug | H04L 63/10 |
| | | | 726/4 |
| 2015/0332318 A1* | 11/2015 | Gauss | G06Q 50/01 |
| | | | 705/14.47 |
| 2016/0036734 A1* | 2/2016 | Ruth | H04W 4/14 |
| | | | 709/206 |
| 2017/0006322 A1* | 1/2017 | Dury | A63F 13/49 |
| 2017/0157512 A1 | 6/2017 | Long et al. | |
| 2017/0331952 A1* | 11/2017 | Rogers | H04L 65/1069 |
| 2018/0104588 A1* | 4/2018 | Zhang | G06F 9/44526 |
| 2019/0244483 A1* | 8/2019 | Collins | A63F 13/352 |
| 2019/0329134 A1* | 10/2019 | Shriram | H04N 21/816 |
| 2019/0354191 A1* | 11/2019 | Reynolds | G06F 3/167 |
| 2020/0274861 A1* | 8/2020 | Black | H04L 63/08 |
| 2020/0387268 A1* | 12/2020 | Shipman | G06F 3/0482 |

\* cited by examiner

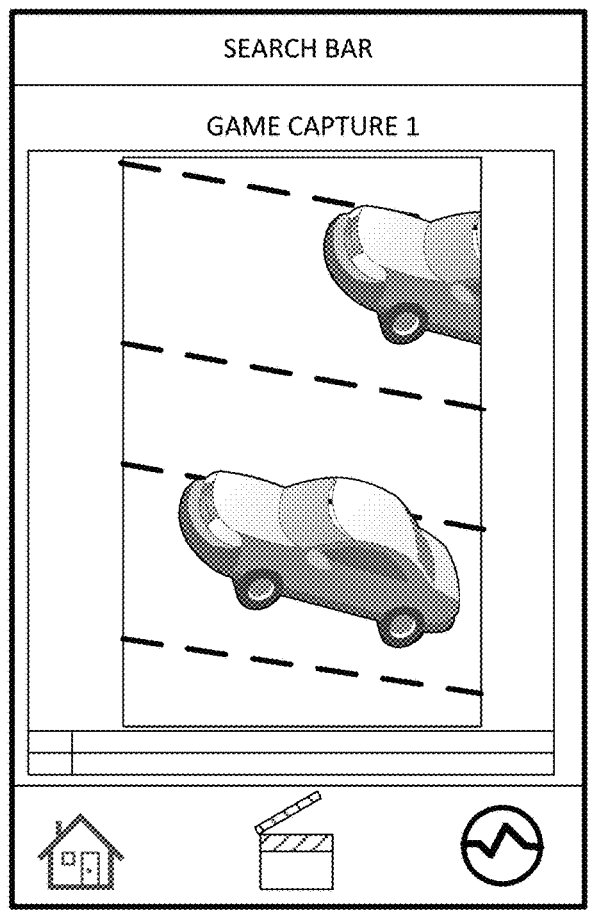
FIG. 7
FIG. 8
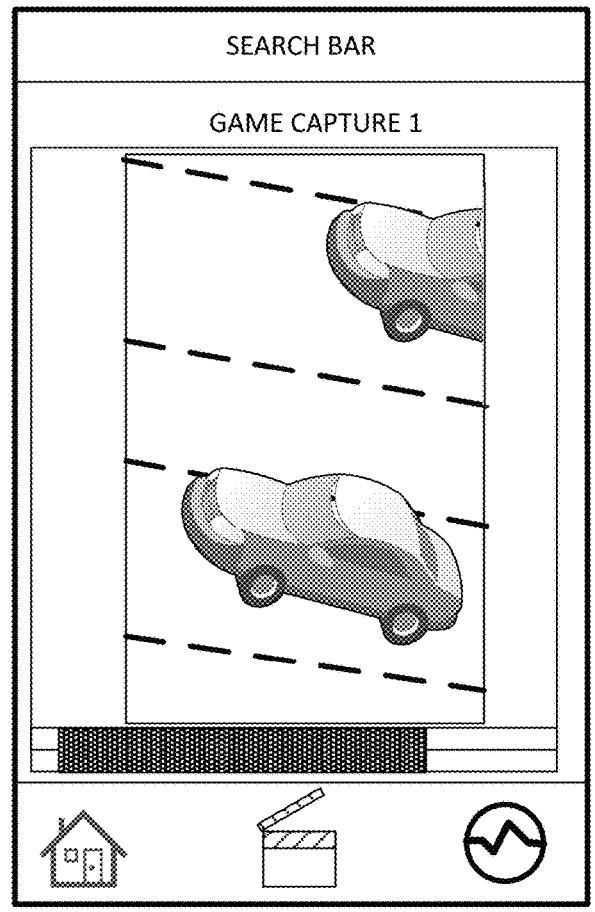

US 11,188,760 B2

METHOD AND SYSTEM FOR GAMING SEGMENT GENERATION IN A MOBILE COMPUTING PLATFORM

RELATED APPLICATIONS

The present application relates to and claims priority to U.S. Provisional Patent No. 62/946,360 filed Dec. 10, 2019.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The disclosed technology relates generally to content generation and distribution systems and more specifically to content generation and distribution of gaming content from a mobile computing device.

BACKGROUND

There has been a growing trend for generating and distributing gameplay content. The content is often referred to as a livestream because it is a stream of the live gameplay. The livestream can be distributed in real-time as the player is actively playing the game or can be recorded and later distributed.

By way of example, U.S. Pat. No. 8,764,569 issued to Livestream, LLC describes multiple techniques for generating livestream broadcasts of video game activities via a server-based arena or electronic sports competitions. Users actively engaged and focused on playing the video game are limited in livestream content management.

Generating gameplay content can be either direct livestream content, showing actual current gameplay, or can be recorded and later distribution of content. Live gameplay content can stream active gameplay, simply generating an alternative output for dynamically generated content.

By contrast, distributing gameplay in a delayed or curated fashion requires further processing requirements as well as storage to store prior gameplay content. Because of the volume of distributed gameplay content, players seek to distributed selected gameplay sequences. The nature of dynamic gameplay is that often the player cannot know ahead of time if the gameplay sequence is worth capturing and distributing. In desktop and game console systems, memory and processing power allow for dynamic capturing of extended sections of gameplay, allowing for the user to later select segments for distribution.

In mobile computing platforms, problems exist with content clip generation. Mobile computing platforms have limited memory and processing capability, such as found in the two mobile platforms of Android® from Alphabet Inc. of Mountain View, Calif. and iOs® from Apple, Inc. of Cupertino. These mobile platforms lack processing power to actively run two programs in the processing foreground. These mobile platforms also lack memory to buffer or store larger quantities of gameplay content for clip detection.

Existing gaming clip generation technology operates in desktop, game console, and network-based environments. There currently are no solutions for generating gameplay clips, extracting, and distributing these clips from a purely mobile computing environment.

Thus, as electronic gaming is becoming more accessible in mobile platforms, there is a need for technical solutions allowing for gameplay clip generation and distribution from these mobile processing platforms.

BRIEF DESCRIPTION

The method and system provides for videogame game clip detection and capture within a mobile computing device. The mobile computing device operates on a mobile computing operating system, such as but not limited to the Android® computing platform.

The method and system includes receiving a user consent from a user via a mobile device user interface running on the mobile device. For example, the user consent can include a touchscreen authorization. The user consent is authorizing the mobile device to capture screen content by a content capture executable.

The nature of mobile computing devices restrict executables to either a foreground or a background position. The foreground position is understood as executing with direct user interface and interaction, such as being directly visible and actively engaged by the user. By contrast, the background position may include processor operations without direct user engagement, executing without an active video output.

In the method and system, the content capture executable is executed by the mobile processing device. Initial execution is in the foreground. After receipt of the user consent, the executable can then change for background execution.

The method and system includes monitoring processing operations in the foreground of the mobile computing device. Monitoring can be performed by the content capture executable. Varying techniques can be used to monitor the processing operations, including for example monitoring battery and processing usage details.

Based on the monitoring of the processing operations, the method and system includes detecting gameplay from a gaming executable executing in the foreground on the processing device. In this example, higher battery usage and increase processing usage can indicate a gaming application being executed in the foreground on the mobile processing device. In another embodiment, gameplay detection can include detecting or recognizing one or more z-order events occurring within an on-screen display, such as by monitoring operating system executables.

The method and system buffers screen content of the gameplay of the gaming executable. This screen content is buffered in a first memory device for a first period of time. Limited memory in mobile devices complicates buffering content. The first period of time can be set based on memory resources, allowing for content buffering without overwhelming the memory resources.

The memory device can also be a circular buffer, whereby in a second period of time, the new buffered content can overwrite prior content. Based on memory and processor settings, the first time period and the second time period can be the same, allocating a buffer to record and overwrite content at the same time period. In another example, the second time period can be smaller than the first time period, such as allowing for multiple buffering gameplay segments or sessions.

During the gameplay capture, the content capture executable executes in the background. Mobile processing devices typically restrict foreground execution to a single application, thus the gaming executable operates in the foreground, the detecting of gameplay and buffering screen content being performed as background operations.

After content capture, the method and system executes the content capture executable in the foreground. The content capture executable can include user interface functionality.

The method and system includes receiving a clip generation command from the user and generating a videogame clip from at least a portion of the screen content in the first memory device based on the clip generation command. For example, via a touchscreen user interface, the user can enter the clip generation command, which may include editing or truncating one or more segments of buffered screen content. For example, the buffered screen content may include 60 seconds of gameplay, the user can select to use the full clip or can truncate to a shorter clip.

The method and system includes receiving a clip distribution command from the user and distributing the videogame clip across a networked connection based on the clip distribution command. Herein, the user can then provide the command to send or distribute the clip across a network external to the mobile processing device. For example, the clip can be sent via a dedicated clip distribution platform.

The method and system includes further operations for clip detection and capturing the mobile device. For example, public distribution of screen content is not appropriate for certain gaming executables or non-gaming executables. It can be a security violation if the executable exposes personal or inappropriate content. Therefore, the method and system can further inhibit screen content capture by determining an identity of the gaming executable executing the foreground on the mobile computing device and comparing the identity of the gaming executable against a reference table. The reference table can include a list of approved executables. The method and system then authorizes screen capture for approved gaming executables and prohibits screen capture for unauthorized gaming executables.

The content capture executable may further include user interface functions for personalizing or attaching a screen name or profile name to distributed content. For example, the user may have a dedicated account with a videogame distribution service or server. Via the content capture executable, the user can then personalize or allow proper electronic attribution of the gameplay clip to his or her user profile. This user profile may also be beneficial for content distribution, such as being distributed to subscribers or other users following the user. Other interfacing operations can include adding tags or other identifiers with the clip, such as the name of the videogame, the mobile computing device, a location, a time, a gameplay segment, an activity visible in the clip, among others.

Thereby, the method and system provides for clip detection and generation in a mobile computing device. The user consent received in a foreground execution authorized background screen capture operations. The monitoring of processing operations minimizes background processing load requirements. The use of time-limited buffering operates within the memory-restrictions of the mobile computing platform. And the alternating between foreground and background execution allows for gaming execution in the foreground with appropriate screen content buffering in the background, as well as foreground clip generation and distribution.

BRIEF DESCRIPTION OF THE DRAWINGS

A better understanding of the disclosed technology will be obtained from the following detailed description of the preferred embodiments taken in conjunction with the drawings and the attached claims.

FIG. 7 illustrates a screenshot of a content capture window within the content capture executable;

FIG. 8 illustrates a user interface function for selecting and generating a videogame clip;

DETAILED DESCRIPTION

Various embodiments are described herein, both directly and inherently. However, it is understood that the described embodiments and examples are not expressly limiting in nature, instead illustrate examples of the advantageous uses of the innovative teachings herein. In general, statements made in the specification of the present application do not necessarily limit any of the various claimed inventions and it is recognized that additional embodiments and variations recognized by one or more skilled in the art are incorporated herein.

Figure 1:
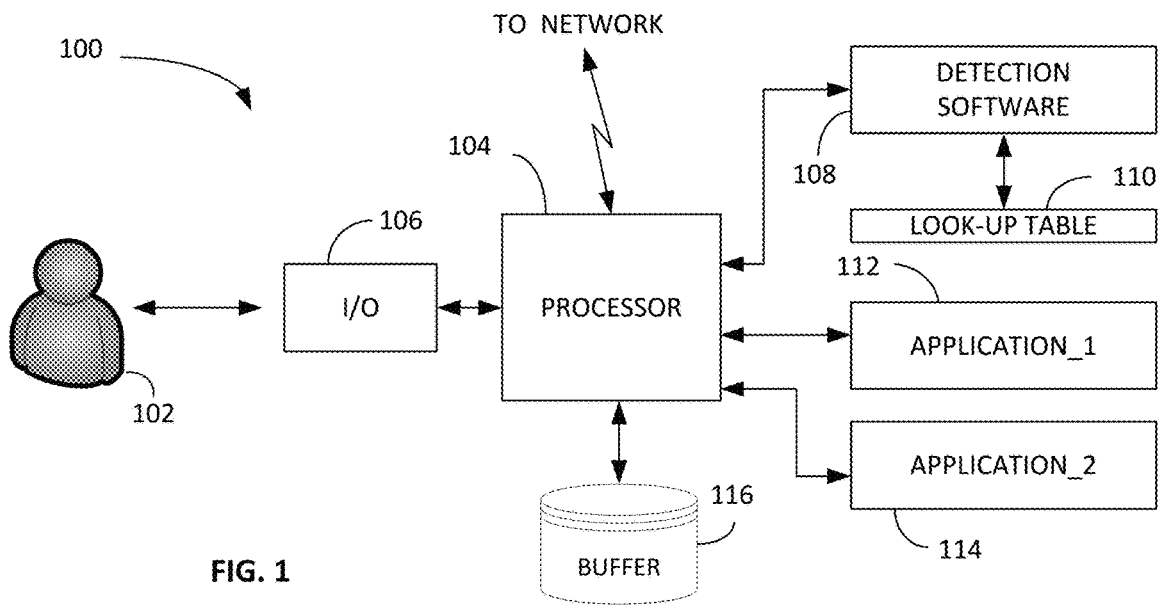
FIG. 1 illustrates a mobile computing device with user interaction.

FIG. 1 illustrates a mobile computing device 100 including processing functionality for videogame clip detection and capturing. The mobile device 100 is accessible by a user 102.

The mobile device 100 includes a processor 104, an input/output interface 106, detection software 108, a look-up table 110, applications 112, 114, and a buffer 116. Additionally, the mobile device 100 includes communication with a network via wireless connectivity.

The mobile device 100 can be any suitable mobile computing device operating a mobile computing operating system (OS) software. The mobile device 100 may be a smartphone, tablet, or similar device with a smaller or reduced screen for aiding mobility. The mobile device 100 differs from known laptop, desktop, or similar computing device(s), where the mobile device 100 operates primarily as a phone or other communication device, including the ability to run mobile device gaming executables on the mobile computing OS software.

For clarity purposes, the mobile device 100 can be a mobile phone, such as a Samsung S-line phone available from Samsung Electronics, an Apple iPhone available from Apple, Inc., or any other mobile phone.

In the mobile device 100, the processor 104 can be one or more mobile processing chipsets including both central processing and graphics rendering functionality. The processor 104 operates the mobile OS software. By way of example, the software may be an Android® OS available from Alphabet, Inc. In other example, the software may be an Apple iOS available from Apple, Inc.

The input/output (i/o) interface 106 can be a combination of hardware and software enabling and facilitating interaction with the user. The i/o interface 106 can include a touchscreen providing video output display, as well as receiving user input. The i/o interface 106 may include audio/visual interfacing including audio output and audible input recognition via a microphone. The i/o interface 106 may include haptic output, such as a vibration and may include motion control or detection for input, such as detecting a user shaking or tilting the device 100. Further i/o interface 106 elements are within the scope of the method and system, including a camera for visual input, wireless connectivity to headphones or other output devices, by way of example.

The detection software 108 is executable processing code stored in a memory buffer and subsequently executed by the processor 104. The software 108, upon execution, creates transformative operations providing technical solutions for videogame clip detection and capturing as described herein.

The look-up table 110 may be any suitable memory or other table structure storing gaming information. The table 110 may be locally stored in the device 100, or in another embodiment can be stored on the network and accessed via the wireless connectivity.

Application one 112 and application two 114 are also executable software code executed by the processor 104. These software executables represent mobile applications, also referred to as apps, on the mobile computing device. Examples of applications 112, 114 can be videogame applications, news applications, social media applications, utility applications, or any other suitable application. The applications 112, 114 can be downloaded from a central mobile application store and stored directly on the device.

The buffer 116 can be any suitable storage device or devices within the mobile device 100. The buffer 116 can be, in one embodiment, a circular buffer, or a standard buffer with overwrite capabilities mirroring a circular buffer. In the mobile device 100, the space available in the buffer 116 is limited, thereby the detection software 108 operates to efficiently utilize available memory space.

Figure 2:
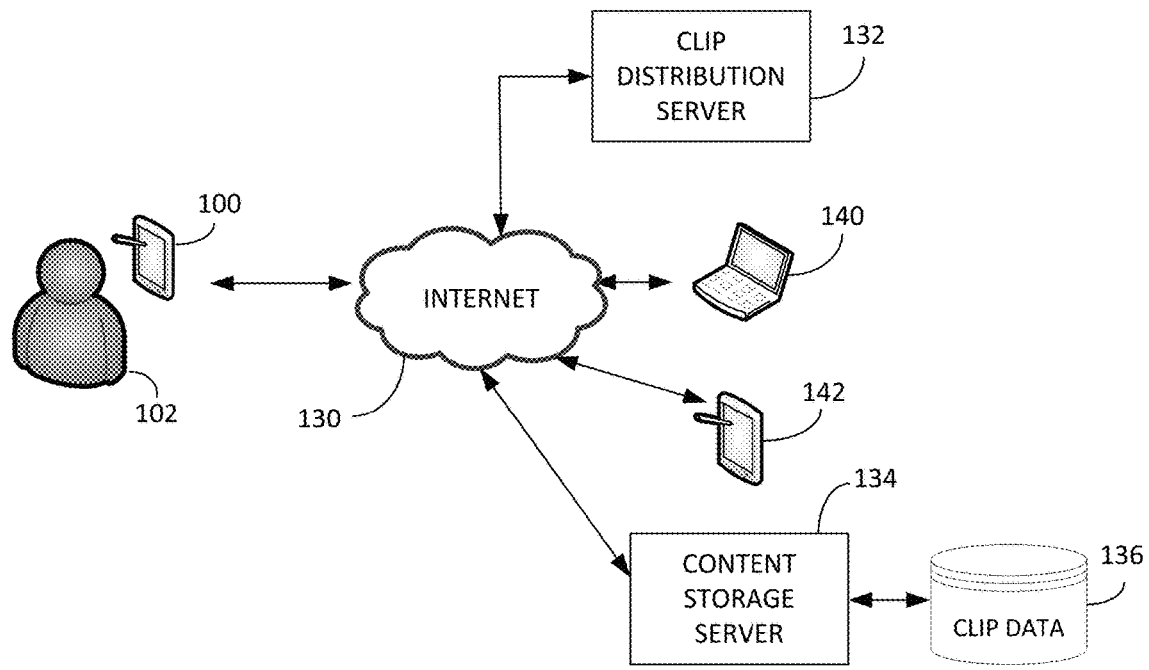
FIG. 2 illustrates a processing system including a mobile gaming device and a clip distribution server.

FIG. 2 provides further environmental operation context for the mobile device 100 as used by the user 102. The mobile device 100, performing operations described in further detail herein, engages the Internet 130 via mobile communication protocols. The Internet 130 can also be any suitable network, public and/or private network, and may include intermediary network connections, such as a wireless network or a mobile telephone network connecting to the Internet 130. For example, the mobile device 100 may use a cellular network from a cellular carrier to reach the network 130. Communication across and connections to the Internet 130 use existing and well-known protocols.

The mobile device 100 connects to a clip distribution server 132 via the network 130. The server 132 can be one or more network-based devices sharing or facilitating distribution of content. The server 132 can include account information for users to submit content for distribution, as well as other users to maintain account data and receive content distribution. In one example, the server 132 can be accessible via a dedicated URL or other network addressing.

In the example of a mobile application, the application can directly communicate with the server via one or more addresses embedded in the application.

Via a website or via a mobile application, users can manage account information for content distribution, for example signing up to receive content from specific users, search and requesting gameplay for a specific game, receiving recent or trending content, by way of example. Moreover, the server 132 can receive incoming content, videogame gameplay clips, and redirect the content back out across the network 130.

In addition to distribution, a content storage server 134, with clip data 136, can also store content for retrieval instead of distribution. For example, the server 134 may operate to push content out to subscribers. In another example, the content storage server 134 may allow for users to pull content therefrom by accessing and retrieving the content. The server 134 can be one more processing devices in a cloud-based or other network configuration with data storage 136 available across the network in accordance with known cloud-based computing techniques.

FIG. 2 additionally illustrates the distribution of content, in this example a laptop computer 140 and a second mobile device 142. As described in further detail below, the distribution of content is distributed to these devices for subsequent viewing of the gameplay segment(s).

Figure 3:
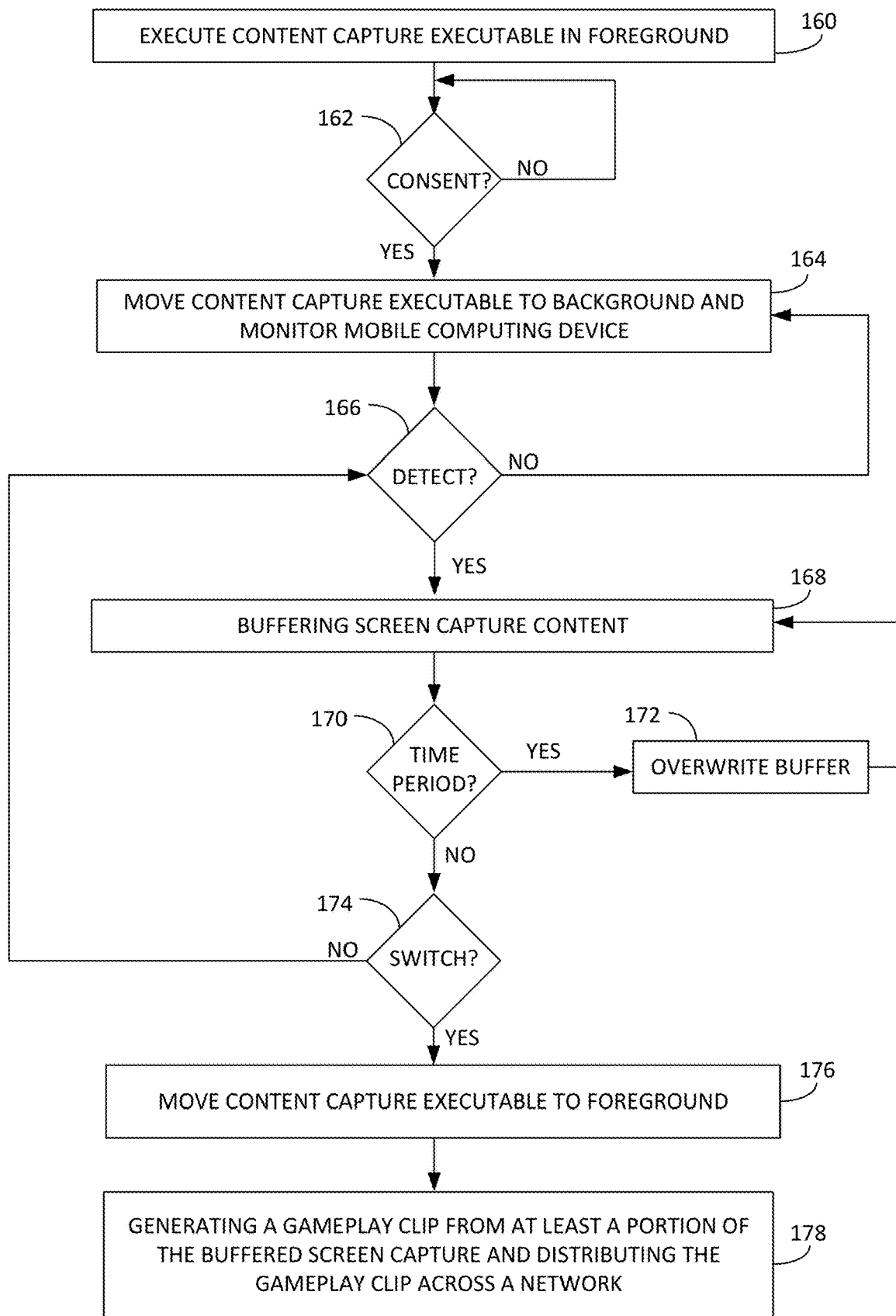
FIG. 3 illustrates a flowchart of the steps of one embodiment of a method for clip generation in a mobile computing device.

More specific to the computerized method and system, FIG. 3 illustrates a flowchart of the steps of an exemplary embodiment for the mobile device 100 of FIG. 1 providing a method and system for videogame clip detection and capturing on a mobile computing device. Step 160 is to execute a content capture executable in a foreground execution on the mobile computing device.

Mobile computing platforms have limited processing capabilities and screen space. Thus, foreground execution is directing the application to execute for direct user input and output. The foreground execution of an application is the application to which the user actively engages. By contrast, the mobile device can operate applications in a background execution, which includes continuing to perform processing operations but not directly engaging the user for input and output functions.

While operating in the foreground, the content capture executable can include any number of functions or features, such as a user account login, setting preferences, or other features. Because of security and platform restrictions, the user may be required to give consent for screen or content capturing on the mobile device. The content capture executable 160 requests user consent for capturing content. This may be via a pop-up window or other user interface.

Step 162 is detecting if the user grants consent. If no, the method reverts until granted. Once granted, the method proceeds.

Step 164 is moving the content capture executable to background execution and monitoring the mobile computing device. Here, the executable continues to perform processing operations, but omitting direct interfacing with the user. The monitoring of the processing operations of the mobile computing device can include any number of techniques, including for example tracking the amount of computing power and memory requirements actively being used by the mobile device.

The computing method and system may include additional techniques for content capture in varying embodiments. For example, one technique may include a voice command from the user. This technique may utilize a voice recognition engine associated with the mobile device.

Another technique may be a hotkey combination with the mobile device. For example, common techniques include double-tapping a home button for electronic payment, depressing the home button and a side button for a screen capture. A hotkey selection can be made available via the mobile operating system to enable game recordation without disrupting current gameplay, e.g. requiring the user to switch active foreground application(s) to then manually turn on recording functions.

Once the content capture executable is in the background, the mobile device executes other applications in the foreground, for example application 112 of FIG. 1. As the user executes these other applications, one of them may be a videogame.

The user, engaging the mobile device, executes an application in the foreground. Meanwhile, the content capture executable monitors via background execution. Therefore, step 166 is if gameplay is detected.

Step 166 can include additional steps beyond the monitoring, including verifying the application is an acceptable application for screen capture. For example, if monitoring is based on processor and memory, a false detection may occur from an application that is not actual gameplay but has processor and memory attributes akin to gameplay.

Additionally, even if monitoring detects gameplay, the application being played may not be suitable for clip detection and distribution. Therefore, one embodiment includes determining an application identifier representing the application being executed in the foreground position. This application identifier is a universal identifier assigned to the application as part of mobile device application (app) distribution via a centralized operating system store. Therefore, gameplay detection may include referencing the application identifier against a table with a reference list of acceptable games or executables approved for content distribution. The reference list can be generated directly from the operating system store or via any other suitable source.

In step 166, if the application is not gameplay, or is not an acceptable application, recordation of content capture can be prohibited. The method reverts back to step 164 to continue monitoring. For example, if the user then quits the current application (e.g. application 112 of FIG. 1) and launches a new application (e.g. application 114 of FIG. 2), the content capture executable continues to actively monitor.

Upon detecting acceptable gameplay, step 168 is buffering screen capture content. The content capture executable continues executing in the background, allowing the user to maintain engagement with the executing application, e.g. videogame. The content capture executable captures screen content without disrupting or interrupting the gameplay. The user consent of step 162 remains active and current because the content capture executable continues to execute.

Buffering of screen content capture has specific limitations because of operating in the mobile environment with limited storage capacities. Therefore, step 170 is determining a time period for content capture. This time period, which may be defined by the user or can be defined by calculating available memory resources, avoids unnecessarily filling up all available memory on the mobile device.

In one embodiment, the memory device can be a circular buffer. After a defined time period, step 172 includes overwriting prior buffered content. For example, the time period may be for a period of 60 seconds with overwriting occurring after this 60 seconds.

The method and system, with dynamic buffering of gameplay, allows for capturing content that has previously occurred in a videogame. The user maintains focus on the gameplay with the content capture executable running the background. Active buffering therefore improves clip detection of already-occurred events. Time periods and circular buffers allows for dynamic buffering accounting for mobile limitations.

The method detects if the user switches applications, step 174. If no, the method continues to detect content and buffer. In one example of switching applications, the user may have just completed a gaming sequence and now wishes to generate a clip.

Step 176 is moving the content capture executable to the foreground position. This foreground position now means the user is actively engaging with the content capture executable.

Step 178 is then, via user interface functions, generating a gameplay clip from at least a portion of the buffered screen capture. This step includes receiving a clip generation command from the user and generating a videogame clip. As noted above, gameplay sequences are dynamically buffered, whereby when the user now moves the executable to the foreground, these clip(s) are available from the mobile device memory. Generation of gameplay clip can include wholesale selection of one or more clips. Further embodiments can include editing clips, such as truncating clips to emphasize specific gameplay. Generation of gameplay clip can also include adding descriptive or identifier content, such as a metadata, descriptors, hashtags, game information, or other content.

The computing method and system can additionally account for capturing audio as part of the gameplay clip. The audio may be in-game audio, user generated audio, or a combination of both. When accounting for storage limitations, the video content is not stored on a frame-by-frame basis, instead using key frames with accounting for interframe video differences. Thus, the method and system stores audio in a separate file apart from the video. The audio is captured using audio capture recording techniques to write the audio content into a buffer. The nature of audio recording uses significantly less storage space, thus limitations associated with video storage are not found in the audio storage process.

The audio is captured using a timestamp or other tracking feature. The audio being separately stored is then later merged back with the video feed for content distribution. This merging is synchronized based on the timestamp.

Where the video content is stored using key frames, further modification of the audio file may be required. For example, if the recorded audio segment aligns outside of a key frame, the audio may be asynchronous. Therefore, further adjustment of the audio file may account for dropping audio content prior to a starting video key frame, ensuring synchronicity between audio and video.

Step 178 further includes distributing the gameplay clip across a network. This includes receiving a clip distribution command from the user and distributing the videogame clip across a networked connection. This distribution can include submitting the clip to a central server, such as a server 132 of FIG. 2. Content can be then be made available to other users via a push method from the server across web-based and/or app-based interfacing.

This distribution can include direct submission to other users or followers via one or more communication platform. This distribution can include uploading to a network storage location, such as a server 134 of FIG. 2 with a link made available for distribution.

Figure 4:
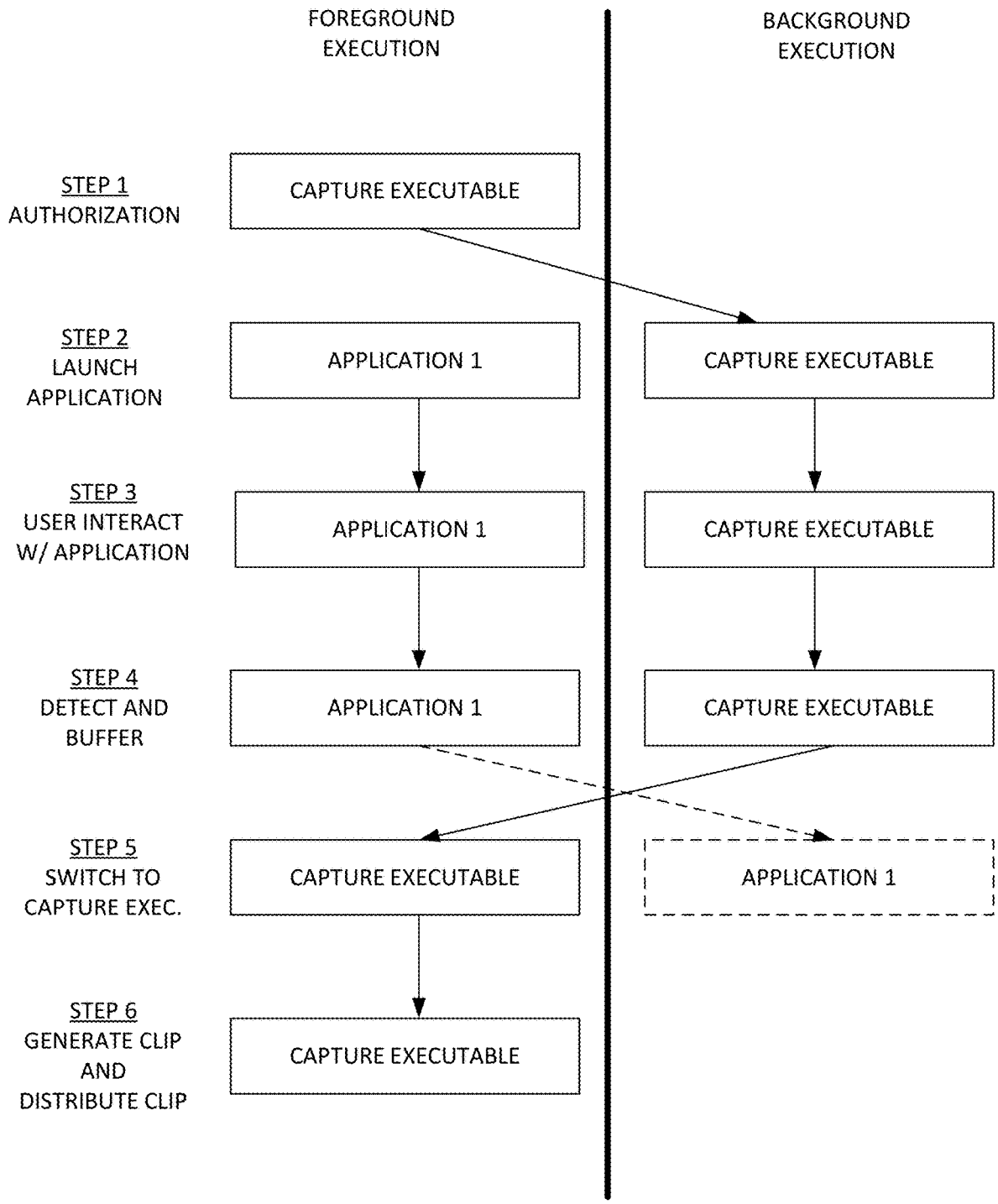
FIG. 4 illustrates flow diagram illustrating transition between foreground and background execution in the mobile computing device.

The method and system operates in the mobile computing environment by adjusting execution between the foreground execution and the background execution. FIG. 4 illustrates a sequential diagram showing execution of various executables in the different positions.

In step 1, the capture executable executes in the foreground position. This first step is the authorization step where a user authorizes content capture in the mobile device. Authorization satisfies security restriction and requirements in the mobile computing platform based on capturing screen content of other executables.

In step 2, the user can then launch a first application. The mobile operating system executes the first application in the foreground position, the capture executable in then moved to background execution. In this background execution, the capture executable continues performing processing operations.

In step 3, the user interacts with the first application, which continues to execute in the foreground position. In one example, if the application is a videogame, the user can be playing the videogame on the mobile computing device. The capture executable still executes in the background, including monitoring execution of the first application.

In step 4, the user continues to interact with the first application still in the foreground position. This could include the user continuing to play the videogame (first application). The capture executable executes in the background to detect and buffer content consistent with techniques described herein.

In step 5, the user either discontinues playing the videogame (first application) or can manually swap the foreground and background execution. In one example, the user may select a home button displaying screenshots of active applications running in the background, scroll through the thumbnails and select the capture executable to move it to the foreground position. In another embodiment, the user can return to a home screen and select an application thumbnail.

In step 5, the user switches to the capture executable, moving the capture executable to the foreground position. If the user is simply swapping positions, the first application can continue to execute in the background position, typically idle awaiting user input. If the user terminates the first application, the application is closed and no longer executes.

In step 6, the user generates the clip and distributes the clip. This step is performed via the capture executable, which continues to run in the foreground position.

Figure 5:
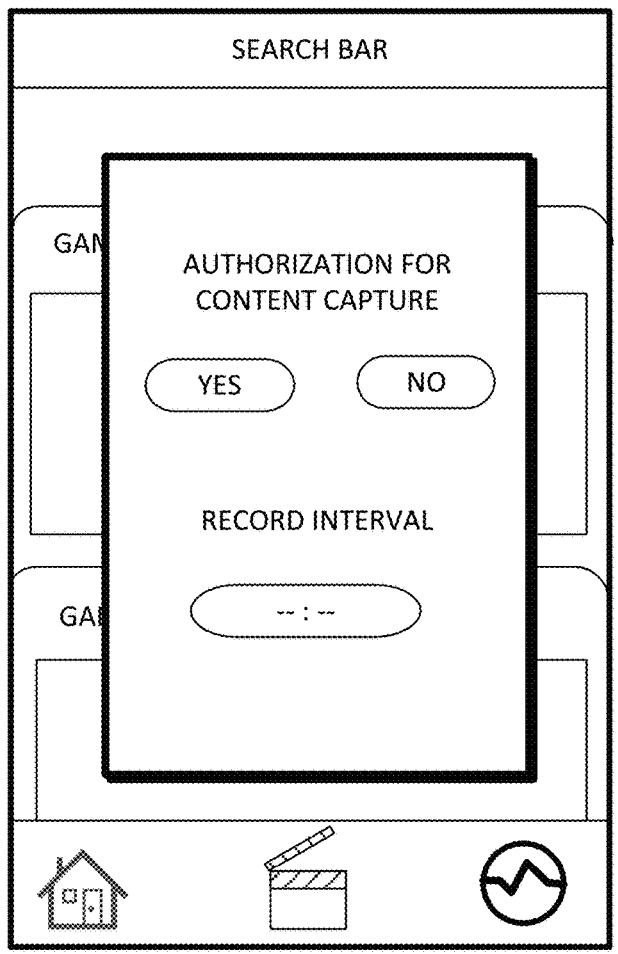
FIG. 5 illustrates a sample screenshot of a content capture executable on a mobile computing device.

For further illustration, FIG. 5 illustrates a sample screenshot of a content capture executable operating in a foreground position. The screenshot illustrates the content capture executable including a user interface window requesting authorization for capturing content.

In this embodiment, the user may also manually enter a record interval for a general clip. This interval can be the time period before a circular buffer overwrites existing content. Further embodiments can include recommendation of time intervals or preset intervals based on existing memory resources. For example, if the mobile device has limited available memory, the interval can be preset at a smaller number or can be restricted to a specific time limit indicating the amount of available memory space.

Figure 6:
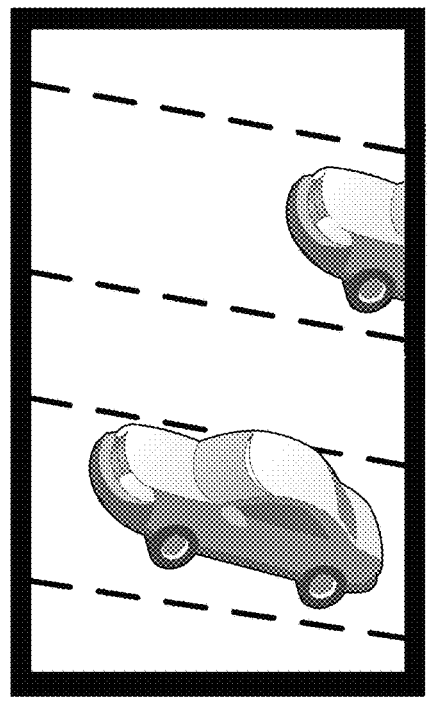
FIG. 6 illustrates a screenshot of a videogame being executed on the mobile computing device in a vertical mode.

The user can select the Yes button, here generating the general content capture authorization. The user may then manually change applications, such as selecting a gaming application. FIG. 6 illustrates a screenshot of a sample driving game. This application runs in the foreground position, the content capture executable moved to the background position.

The user plays the game, the content capture detecting gameplay and capturing content. After completion of a period of gameplay, FIG. 7 illustrates a screenshot of the user moving the content capture executable to the foreground position. This screenshot shows recorded content, here two cars racing. Below the content is a time bar.

FIG. 8 illustrates clip generation commands, including selecting a portion of the clip. Here, a portion of the time is highlighted, selecting that specific portion for inclusion in the clip. Consistent with known clipping techniques, the non-highlighted portions may be discard. For example, if the total scene is 60 second long, the clip can be truncated to a specific 34 second portion, the extraneous 26 seconds are discarded.

Figure 9:
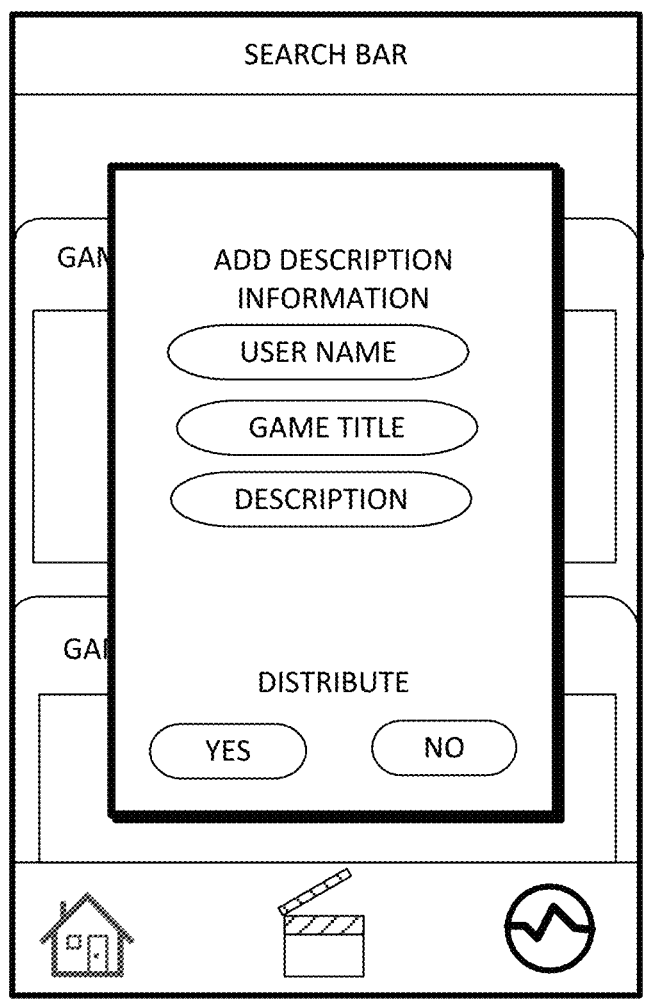
FIG. 9 illustrates a user interface function for adding descriptive content to the videogame clip and receiving a clip distribution command.

FIG. 9 illustrates a screenshot of further clip generation commands, including adding descriptions or other identifiers. These fields can be user-generated content or can be recommended content based on existing game or user profile information. Further in the screenshot, a clip distribution command here is a selection button to either distributed or save the generated clip. As described above, upon selection of the clip distribution command, the clip can then be distributed across a network connection for further distribution.

Operating in a mobile computing device includes additional processing specifics, such as screen orientation and view mode. A mobile device can be operated in a vertical (portrait) mode, or a horizontal (landscape) mode. The screen capture differs based on these modes. Additionally, different games are designed for different modes, therefore the content capture and clip generation can further account for this orientation mode.

Figure 10:
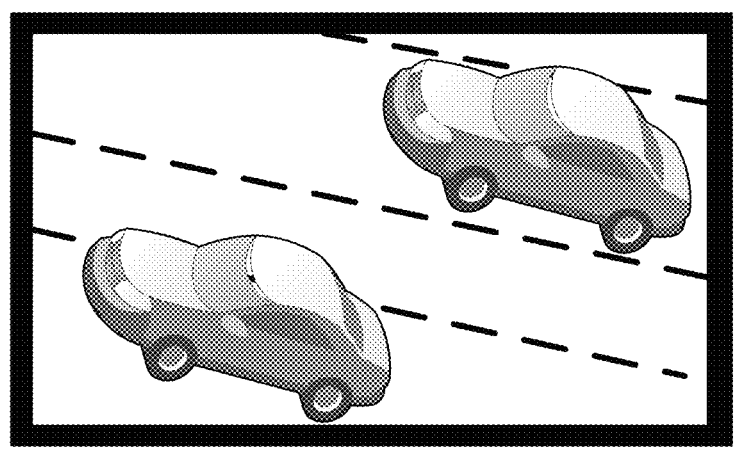
FIG. 10 illustrates a screenshot of a videogame being executed on a mobile device in a horizontal mode.

FIG. 6 above illustrated the exemplary racing game in vertical mode. FIG. 10 illustrates the mobile device and game in a horizontal mode. In this mode, the width of the display is greater than the height of the display.

Different games can operate in different modes. Some games operate solely in one mode, while other games can alternate modes. Alternating modes can be in response to the user selecting to rotate the mobile device, or a game may have a gameplay sequence to be performed in one mode with normal gameplay in another mode.

Mobile devices, via the mobile operating system, include mode detection routines using known operations. In normal mobile device operation, the user can rotate the phone ninety degrees, the screen automatically updating display between modes. This updating can include resizing a display screen as appropriate.

The display orientation is not something provided by the game application, but rather is something typically performed when translating gameplay processing by the game application to display on an output screen.

During operation of the mobile device, the user can rotate the orientation of the device, e.g. switching from portrait to landscape mode. Therefore, the content capture executable, writing content, continues to write the same gaming content without knowledge of the orientation.

Generating gaming clips seeks to mirror the user's display orientation. Therefore, in one embodiment the content capture executable can include executable instructions to determine or otherwise recognized gameplay orientation.

One embodiment may include using frame data to detect orientation. The frame data can be extracted via an API or can be extracted from any suitable output display processing routine.

For example, to detect orientation, the system can use the aspect ratio or black bars from the frames to determine whether the user is playing the game on the mobile device in either horizontal or vertical (portrait or landscape) mode.

One orientation detection technique uses edge detection and determines an amount of whitespace or amounts of visible straight lines. The mobile device typically operates in a 16:9 aspect ratio, therefore the length of a line can indicate specific orientation.

A further embodiment for orientation detection can use machine learning processing. For example, machine learning can include known data sets indicating existing images in known orientations. Visual or processing comparisons of different images allows for learning if processing a sequence of images is within the vertical or horizontal orientation.

Figure 11:
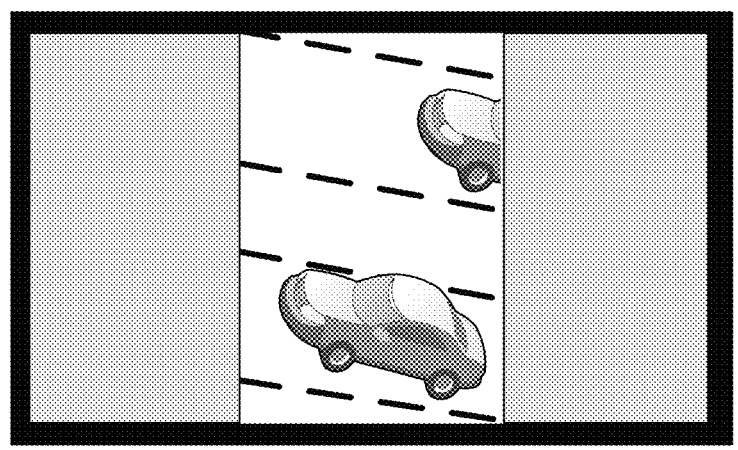
FIGS. 11-12 illustrate sample videogame clip screen displays with offset display modes.

FIG. 11 illustrates a clip output acquired or played within the game in a horizontal mode but displayed in a landscape mode. This shows the image height 162 in a square format, in this example using a 16:16 aspect ratio.

Figure 12:
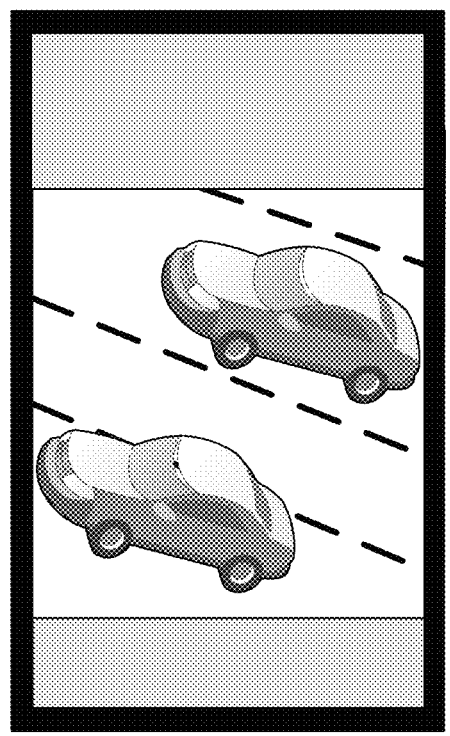

FIG. 12 illustrates one embodiment of modifying clip distribution accounting for change in orientation. The gameplay sequence is in a portrait mode, but the clip segment is shown in a landscape mode. Here, gray or shaded (e.g. black-out) segments are used to present a full screen display. In other embodiments, the segments can be secondary or meta-data display window content, such as information on the game itself and user (player) information for example.

The present method and system may include additional features to emphasize and optimize storage location within the mobile device. For example, one embodiment may include using partial frame recording techniques, such as storing anchor or key frames and storing per-frame adjustments between anchor frames. In another example, storage of frames may use compression techniques.

In one embodiment, the computerized method and system may operate one or more techniques for additionally overcoming buffer mobile device buffer limitations. Maximum content capture buffer size is limited by the operating system. It is typical for the mobile operating system to cap the maximum available RAM per software executable. One technique for overcoming these restrictions is launching one or more secondary executables providing content capture. In this embodiment, the original content capture executable operates as the primary executable including operating instructions to manage the secondary executables. Via communication between the primary and secondary executables to transfer buffer data to these secondary processes.

When a user directs clip generation, the primary executable retrieves secondary executable buffer content on demand using the same communication between these executables. Wherein, the spawning of secondary executables mitigates the RAM per process restrictions by increasing the number of executables and therein scaling up the number of available RAM storage space.

In a further embodiment, clip detection and/or generation can be utilized OS software shortcuts available to the user. For example, an OS may include a hotkey or button clip designation for an optimized shortcut. One example of a shortcut is pressing a home button and the power button to capture a screenshot. Personalization routines can modify or use existing OS shortcuts for clip generation. For example, if the screenshot capture shortcut is modified to be a clip capture during execution of the content capture executable, this shortcut can be used in lieu of or supplement to the dynamic clip detection and storage described herein.

Herein, the present method and system allows for clip detection, recordation, and distribution within a mobile computing device operating a mobile OS. The method and system operates within the processing and memories restrictions of the mobile platform, while allowing for videogame capture and distribution.

Figures presented herein are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

The invention claimed is:

1. A computerized method for videogame clip detection and capturing on a mobile computing device executing a mobile operating system software, the mobile computing device including a processing device located therein, the processing device executing executables via the mobile operating system software and coordinating user interfacing via at least one mobile device user interface, the method comprising:

executing a content capture executable via the mobile operating system software, executing the content capture executable in a foreground execution by the processing device, wherein the foreground execution is execution by the processing device with active user interfacing including a graphical output display and receiving user input interaction via the mobile device user interface;

while the content capture executable executes in the foreground execution, receiving a user consent from a user via the mobile device user interface, the user consent for capturing screen content by the content capture executable executing on the processing device of the mobile computing device;

transferring the content capture executable from the foreground execution to a background execution, wherein the background execution is execution by the processing device without the active user interface including without the graphical output display and without the receiving user input interaction via the mobile device user interface;

detecting gameplay from a gaming executable executing in the foreground execution on the processing device based on the monitoring of processing operations;

in response to instructions from the content capture executable in the background execution and based on the detecting the gameplay, buffering screen content of the gameplay of the gaming executable in a first memory device for a first period of time;

transferring the content capture executable into the foreground execution of the mobile computing device, including:

receiving a clip generation command from the user and generating a videogame clip from at least a portion of the screen content in the first memory device based on the clip generation command; and receiving a clip distribution command from the user and distributing the videogame clip across a networked connection based on the clip distribution command.

2. The computerized method of claim 1 further comprising:

determining an identity of the gaming executable executing the foreground on the mobile computing device;

comparing the identity of the gaming executable against a reference table, wherein the reference table includes a list of gaming executables approved for content distribution; and authorizing the buffering of the screen content if the gaming executable is approved for content distribution based on the reference table.

3. The computerized method of claim 2 further comprising:

prohibiting the buffering of the screen content if the gaming executable is not approved for content distribution based on the reference table.

4. The computerized method of claim 2, wherein the identity of the gaming executable is determined using an application identifier.

5. The computerized method of claim 1, wherein the first memory device is a circular buffer.

6. The computerized method of claim 5, wherein upon expiration of a second period of time, the buffering of the screen content overwrites previously stored screen content stored in the circular buffer.

7. The computerized method of claim 6, wherein the first period of time is at least one of: less than the second period of time and the same as the second period of time.

8. The computerized method of claim 1 further comprising:

generating user profile information associated with the user who provided the user content for capturing screen content; and adding the user profile information to the videogame clip.

9. The computerized method of claim 8, wherein the adding the user profile information to the videogame clip is performed prior to the distributing the videogame clip across a networked connection.

10. The computerized method of claim 1, wherein the distributing the videogame clip across the network connection further comprises:

distributing the videogame clip to a content distribution server.

11. A system for videogame clip detection and capturing, the system comprising:

a mobile computing device executing a mobile operating system software, the mobile computing device including at least one processing device and a memory device storing executable instructions therein, the at least one processing device executing the executable instructions via the mobile operating system software and coordinating user interfacing via at last one mobile device user interface, in response to the executable instructions, operative to:

execute a content capture executable via the mobile operating system software, executing the content capture executable in a foreground execution by the processing device, wherein the foreground execution is execution by the processing device with active user interfacing including a graphical output display and receiving user input interaction via the mobile device user interface;

while the content capture executable executes in the foreground execution, receive a user consent from a user via the mobile device user interface, the user consent for capturing screen content by the content capture executable executing on the processing device of the mobile computing device;

transfer the content capture executable from the foreground execution to a background execution, wherein the background execution is execution by the processing device without the active user interface including without the graphical output display and without the receiving user input interaction via the mobile device user interface;

detect gameplay from a gaming executable executing in the foreground execution on the processing device based on the monitoring of the processing operations;

in response to instructions from the content capture executable in the background execution and based on the detecting the gameplay, buffer screen content of the gameplay of the gaming executable in a first memory device for a first period of time;

transfer the content capture executable into the foreground execution of the mobile computing device, including:

receive a clip generation command from the user and generating a videogame clip from at least a portion of the screen content in the first memory device based on the clip generation command; and receive a clip distribution command from the user and distributing the videogame clip across a networked connection based on the clip distribution command.

12. The system of claim 11, the processing device, in response to the executable instructions, further operative to:

determine an identity of the gaming executable executing the foreground on the mobile computing device;

compare the identity of the gaming executable against a reference table, wherein the reference table includes a list of gaming executables approved for content distribution; and authorize the buffering of the screen content if the gaming executable is approved for content distribution based on the reference table.

13. The system of claim 12, the processing device, in response the executable instructions, further operative to:

prohibit the buffering of the screen content if the gaming executable is not approved for content distribution based on the reference table.

14. The system of claim 12, wherein the identity of the gaming executable is determined using a gameplay identifier.

15. The system of claim 11, wherein the first memory device is a circular buffer.

16. The system of claim 15, wherein upon expiration of a second period of time, the buffering of the screen content overwrites previously stored screen content stored in the circular buffer.

17. The system of claim 16, wherein the first period of time is at least one of: less than the second period of time and the same as the second period of time.

18. The system of claim 11, the processing device, in response the executable instructions, further operative to:
generate user profile information associated with the user who provided the user content for capturing screen content; and
add the user profile information to the videogame clip.

19. The system of claim 18, wherein the adding the user profile information to the videogame clip is performed prior to the distributing the videogame clip across a networked connection.

20. The system of claim 11, wherein the distributing the videogame clip across the network connection includes the processing device, in response the executable instructions, further operative to:
distribute the videogame clip to a content distribution server.

\* \* \* \* \*